(12) United States Patent
Bonaccorso (10) Patent No.: US 9,854,941 B2
(45) Date of Patent: Jan. 2, 2018

(54) LID FOR REDUCING FUMES IN AN AIR-BASED FRYER

(71) Applicant: KONINKLIJKE PHILIPS N.V., Eindhoven (NL)

(72) Inventor: Davide Bonaccorso, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/034,333

(22) PCT Filed: May 8, 2015

(86) PCT No.: PCT/EP2015/060160
§ 371 (c)(1),
(2) Date: May 4, 2016

(87) PCT Pub. No.: WO2015/176973
PCT Pub. Date: Nov. 26, 2015

(65) Prior Publication Data
US 2017/0065127 A1    Mar. 9, 2017

(30) Foreign Application Priority Data

May 23, 2014 (EP) ..................................... 14169618

(51) Int. Cl.
*A21B 1/22* (2006.01)
*A47J 37/12* (2006.01)
(Continued)

(52) U.S. Cl.
CPC ............... *A47J 37/128* (2013.01); *A21B 1/26* (2013.01); *A23L 5/10* (2016.08); *A47J 37/0641* (2013.01);
(Continued)

(58) Field of Classification Search
CPC ......... A21B 1/26; F24C 15/322; F24C 15/325
(Continued)

(56) References Cited

U.S. PATENT DOCUMENTS 1,532,718 A * 4/1925 Shover ...................... F26B 9/06
  219/400
2,412,103 A * 12/1946 Spooner ................ F24C 15/322
  126/21 A (Continued)

FOREIGN PATENT DOCUMENTS

CN        203354363 U      12/2013
CN        203424828 U       2/2014
(Continued)

*Primary Examiner* — Reginald L Alexander (57) ABSTRACT

The invention relates to an air-based flyer apparatus (100) for preparing food. The apparatus comprises a food preparation chamber (102), a food basket (103) placed in said food preparation chamber (102), a system (104) for circulating an upward flow of hot air inside said food basket (103), a heating element (105) placed above said food basket (103) to generate said hot air, a lid (101) placed below the heating element for covering the food basket. The lid (101) comprises a first part (P1) being air-permeable, and a second part (P2) facing said heating element (105) being air-impermeable. The invention allows reducing fumes generated by an air-based flyer during cooking process.

13 Claims, 11 Drawing Sheets

(51) Int. Cl.
  *A21B 1/26* (2006.01)
  *A23L 5/10* (2016.01)
  *A47J 37/10* (2006.01)
  *A47J 37/06* (2006.01)
  *F24C 15/32* (2006.01)

(52) U.S. Cl.
  CPC ......... *A47J 37/108* (2013.01); *A23V 2002/00* (2013.01); *F24C 15/322* (2013.01)

(58) Field of Classification Search
  USPC ......... 99/476, 474, 473; 126/21 A; 219/400, 219/681, 735; 220/372
  See application file for complete search history.

(56) References Cited

U.S. PATENT DOCUMENTS

| | | | | |
|---|---|---|---|---|
| 2,966,573 | A * | 12/1960 | Hansen | ........................ 126/21 A |
| 4,010,341 | A * | 3/1977 | Ishammar | ............. F24C 15/322 |
| | | | | 126/21 A |
| 4,385,075 | A * | 5/1983 | Brooks | ................... A23L 3/365 |
| | | | | 426/393 |
| 4,499,356 | A * | 2/1985 | Hatagawa | ............ H05B 6/6402 |
| | | | | 219/729 |
| 4,622,231 | A | 11/1986 | Swartley | |
| 5,126,520 | A * | 6/1992 | Nottingham | .......... A47J 36/027 |
| | | | | 219/729 |
| 5,994,672 | A * | 11/1999 | Mestnik | .................. A47J 36/38 |
| | | | | 219/400 |
| D524,600 | S * | 7/2006 | Austin | .......................... 219/400 |
| 8,299,404 | B2 | 10/2012 | Van Der Weij | |
| 2004/0253348 | A1 | 12/2004 | Woodward | |
| 2009/0117245 | A1* | 5/2009 | Peyrat | ..................... A47J 37/01 |
| | | | | 426/523 |
| 2009/0223379 | A1 | 9/2009 | Malek Azary | |
| 2011/0214574 | A1 | 9/2011 | Chang | |
| 2015/0204546 | A1* | 7/2015 | Onnermark | ........... A47J 37/047 |
| | | | | 219/400 |

FOREIGN PATENT DOCUMENTS

| | | |
|---|---|---|
| CN | 203447187 U | 2/2014 |
| CN | 203597772 U | 5/2014 |
| FR | 2949656 A3 | 3/2011 |
| JP | 2005237464 A | 9/2005 |
| KR | 20140035992 A | 3/2014 |
| WO | 0181200 A1 | 11/2001 |
| WO | 2010044909 A1 | 4/2010 |

* cited by examiner

LID FOR REDUCING FUMES IN AN AIR-BASED FRYER

This application is the U.S. National Phase application under 35 U.S.C. §371 of International Application No. PCT/EP2015/060160, filed on May 8, 2015 which claims the benefit of International Application No. 14169618.7 filed on May 23, 2014. These applications are hereby incorporated by reference herein.

FIELD OF THE INVENTION

The invention relates to a lid for air-based fryer.

The invention also relates to an air-based fryer apparatus comprising a lid according to the invention, and to a method of reducing fumes emission in an air-based fryer.

The invention may be used in the field of kitchen appliances.

BACKGROUND OF THE INVENTION

Air-based fryers are known for cooking food ingredients, for example fries or chicken, wherein the heat for preparing the food ingredients is provided by hot air. To heat the food ingredients for the preparation and cooking purpose, a flow of hot air is generated to pass the food ingredients placed in a food basket put in a food preparation chamber. This type of appliances can be used in the household environment. However, with such appliances, it sometimes happens that fumes are generated during the cooking process, which fumes are better to be kept at a minimum for considering hygiene, odors and safety issues. A reduction of fumes can be achieved, for example, by reducing the temperature of the hot air circulating. However, in some food preparation, the food preparation still requires a relative high temperature, for example 160° C.

OBJECT AND SUMMARY OF THE INVENTION

It is an object of the invention to propose a solution to reduce the emission of fumes in an air-based fryer apparatus. The invention is defined by the independent claims. The dependent claims define advantageous embodiments.

Air-based fryer apparatus comprise a food preparation chamber, a food basket placed in said food preparation chamber, a system for circulating an upward flow of hot air inside said food basket, a heating element placed above said food basket to generate said hot air.

The solution to reduce the emission of fumes according to the invention is to provide a lid cooperating with the food basket, the lid comprising:
  a first part being air-permeable,
  a second part being air-impermeable facing said heating element.

With known air-based fryers, large part of the flow of hot air reaches directly the heating element, resulting in generation of fumes if the flow of hot air contains substantive amount of fat particles. The fumes are caused by the particles of fat which burn when getting into contact with the heating element being at very high temperature.

With the present invention, because the second part of the lid is air-impermeable and faces the heating element, this avoids that majority of the flow of hot air reaching the heating element directly, resulting in that a reduced amount of fumes is generated. In other words, the air-impermeable part blocks part of the particles of fat contained in the flow of hot air, resulting in that a smaller amount of fat particles reach the heating element. The first part of the lid is air-permeable to still allow an air circulation in the food basket, and the air to be heated by the heating element.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
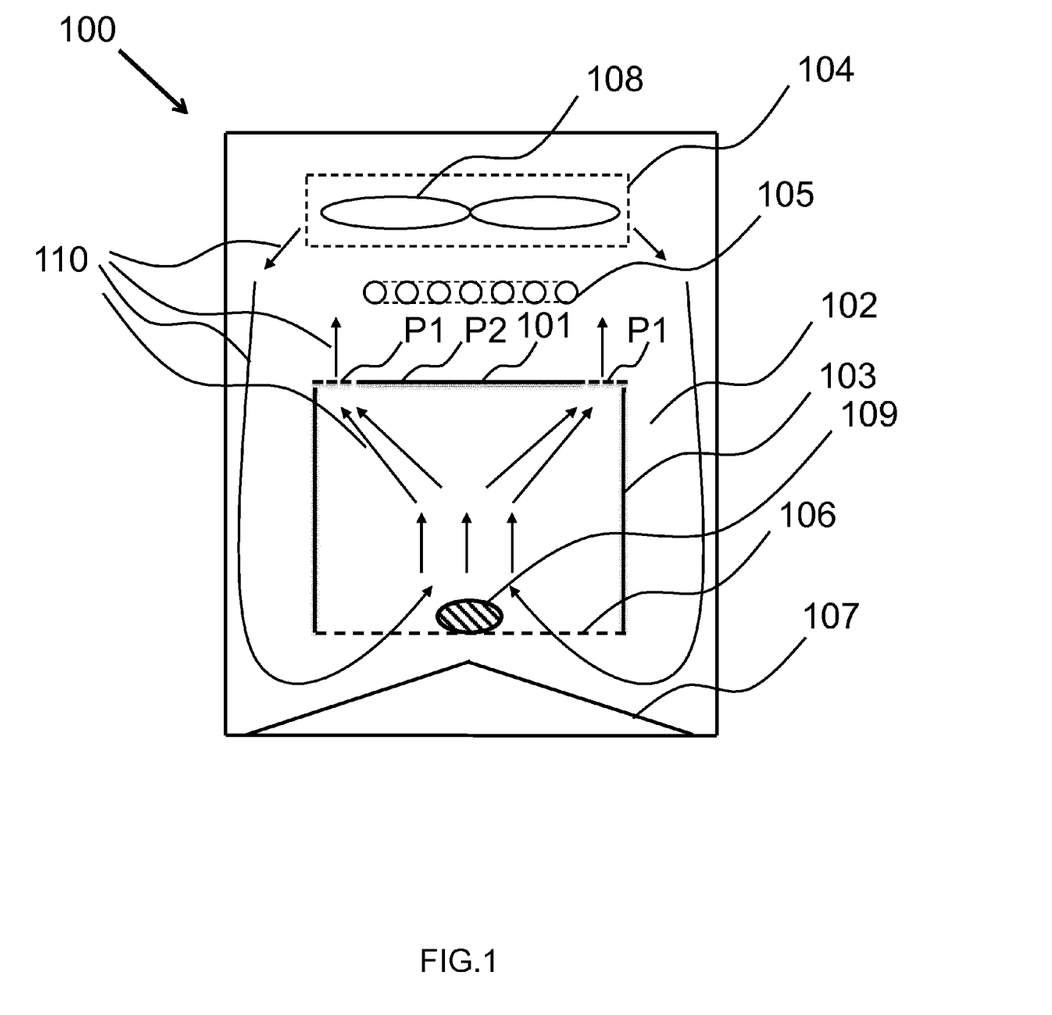
FIG. 1 depicts a first apparatus implementing a lid according to the invention.

FIG. 1 illustrates a lid 101 according to the invention for use with an apparatus 100 for preparing food.

The apparatus 100 comprises a food preparation chamber 102, a food basket 103 placed in said food preparation chamber 102, a system 104 for circulating an upward flow of hot air inside the food basket 103, a heating element 105 placed above said food basket 103 to generate said hot air. For example, the heating element 105 is made of a spiral electrical heating tube. For example, the system 104 comprises a fan 108 placed above the heating element 105. The circulation of the flow of hot air is illustrated by various arrows 110. The food basket 103 comprises a bottom part 106 with a plurality of openings (illustrated by an horizontal dashed segment, for example made of a meshed material extending horizontally). An air guide member 107 is optionally placed below the bottom part 106 to help direct air upward in the food basket 103.

Food ingredients 109 are intended to be placed on the bottom part 106 of the food basket 103, such that hot air which is circulated inside the apparatus flows towards the food ingredients 109 for cooking purpose. For example, food ingredient 109 corresponds to chips potatoes, chicken wings, or any other food that can be cooked via hot air. When food is cooked, food is taken out from the apparatus via an opening on the lateral side of the apparatus (not shown), for example via a drawer mechanism. For example, if the apparatus is intended to domestic usage, a flow of hot air having a rate of 20 litters per second can be used, and the temperature of air is preferably in the range [80° C.; 250° C.].

The lid 101 comprises a first part P1 being air-permeable, and a second part P2 being air-impermeable. The second part P2 faces the heating element 105.

If the heating element 105 is positioned at an inner or central location in the food preparation chamber 102, as illustrated in FIG. 1, the second part P2 corresponds to an inner part of the lid 101, and the first part P1 corresponds to an outer part of the lid 101.

Figure 2:
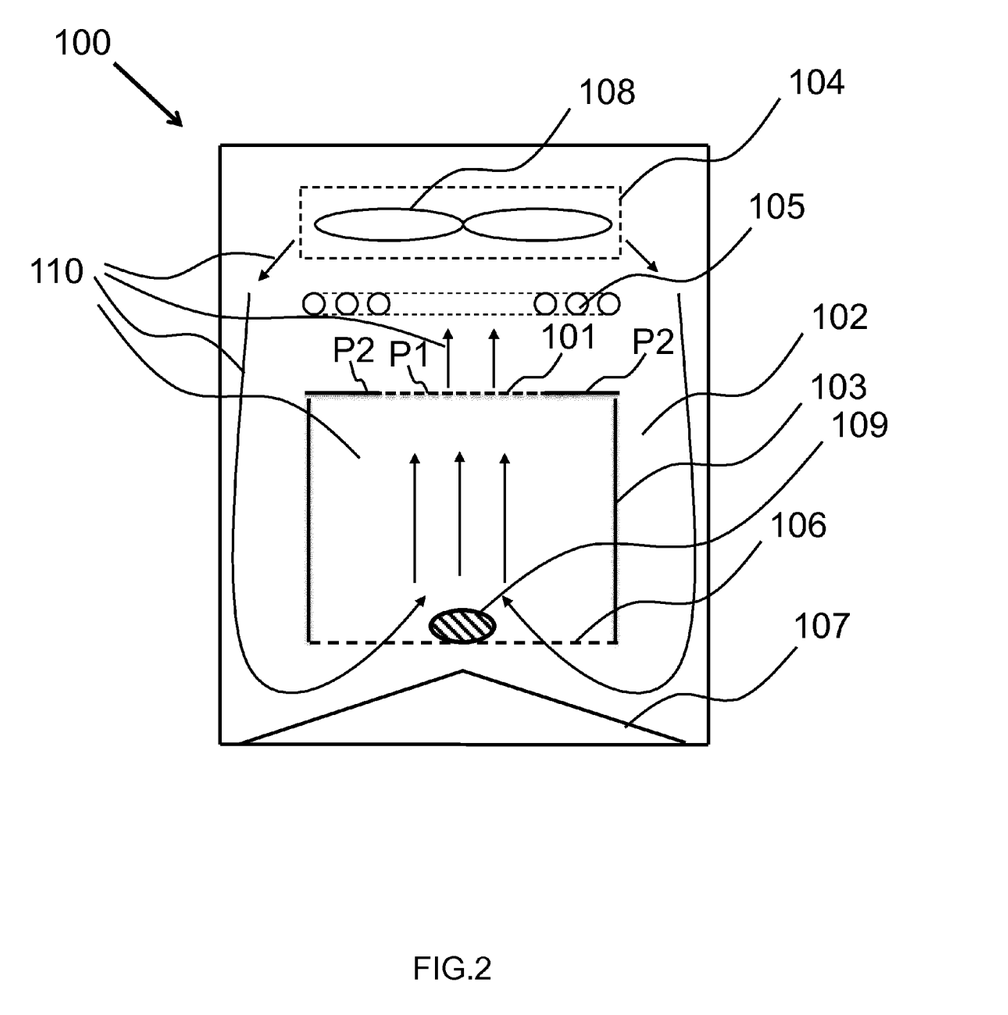
FIG. 2 depicts a second apparatus implementing a lid according to the invention.

If the heating element 105 is positioned at an outer location in the food preparation chamber 102, as illustrated in FIG. 2, the second part P2 corresponds to an outer part of the lid 101, and the first part P1 corresponds to an inner part of the lid 101.

Figure 3A:
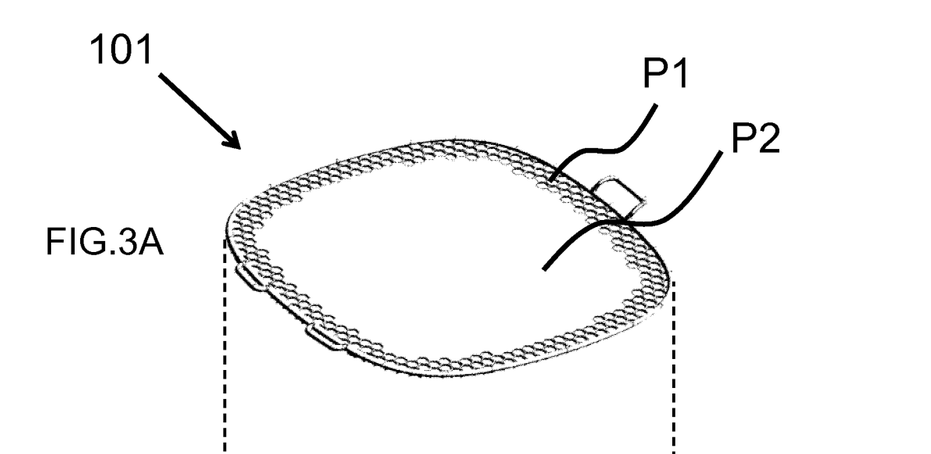
FIG. 3A and FIG. 3B depict a food basket cooperating with a lid according to the invention.
Figure 3B:
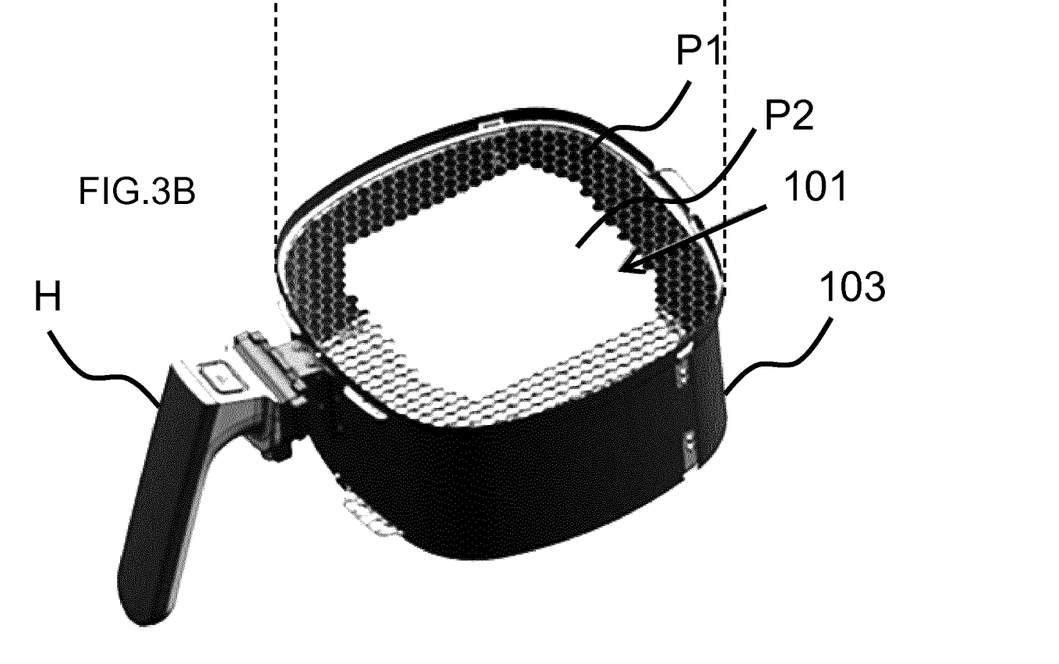

FIG. 3A illustrates by a three-dimensional view, an example of a lid 101 according to the invention, and FIG. 3B illustrates by a three-dimensional view the lid 101 when cooperating with the food basket 103. The food basket 103 advantageously comprises a handle H so that a user can take the food basket 103 out of the food preparation chamber. For sake of clarity, the handle H will not always be represented in the various drawings illustrating the invention.

Figure 4:
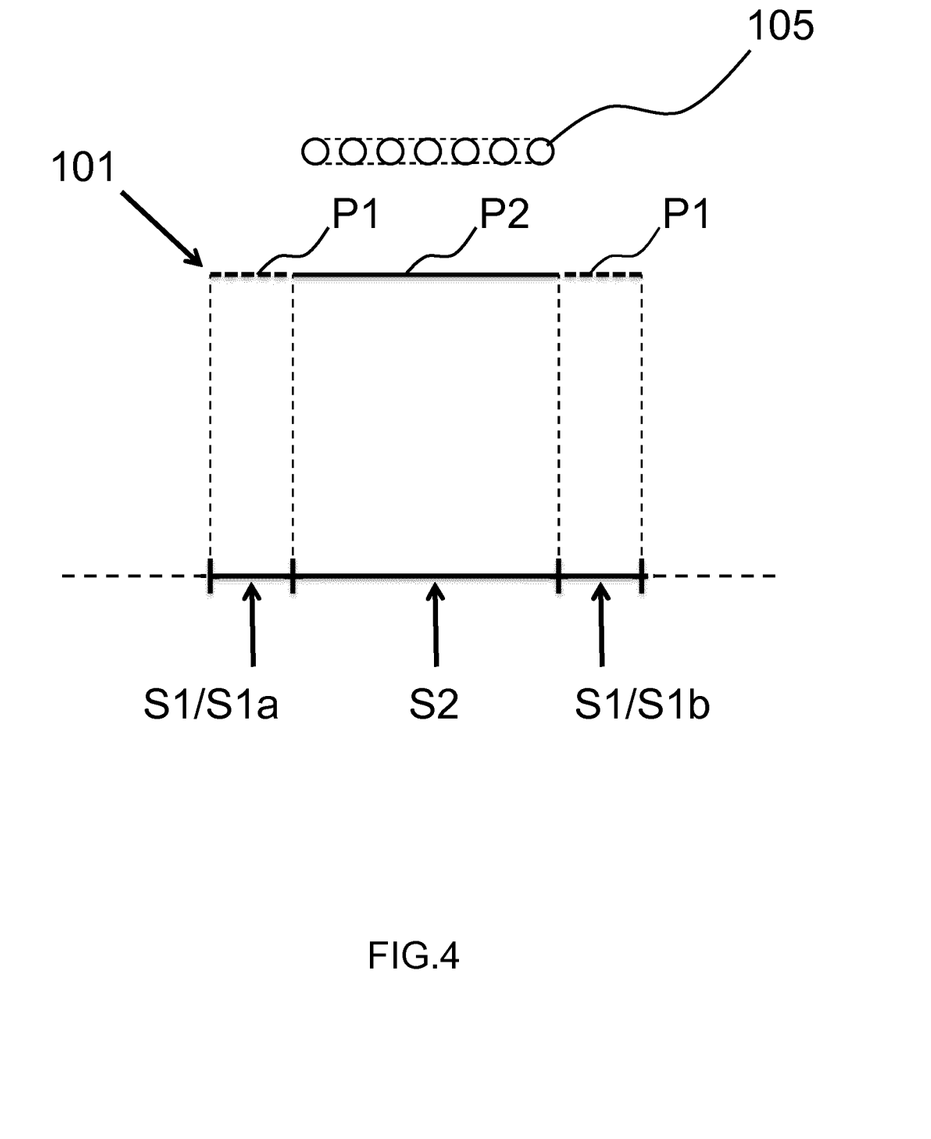
FIG. 4 illustrates characteristics of a lid according to the invention.

FIG. 4 illustrates a cross-section of an arrangement comprising a lid 101 according to the invention placed below a heating element 105. The vertical projection of the surface of the first part P1 defines a first surface S1. Note in this example, since the first part P1 is at an outer part of the lid 101, the first surface S1 is shown as having two sub-parts S1$a$ and S1$b$, with S1=S1$a$+S1$b$. The vertical projection of the surface of the second part P2 defines a second surface S2. Advantageously, the ratio between the first surface S1 and the sum S=S1+S2 of the first surface S1 and the second surface S2 is preferably in the range [5%; 50%]. This range allows an optimal balance between having a sufficient part of the flow of hot air which is blocked by the second part P2 (and which limits particles of fat flowing towards the heating element), and having a sufficient part of flow of hot air that can still circulate inside the food preparation chamber via the second part P1 to ensure cooking of food ingredients. Note that a ratio going higher than 50% could still contribute to reduce emission of fumes, but in a less effective manner.

For example, if a lid having an overall surface size of S=S1+S2=41610 mm2, the surface S1 of the air-permeable part P1 may be chosen such that S1=7435 mm2, resulting in a ratio S1/S=17%.

Advantageously, the second surface S2 is substantially the same as the overall (horizontal) surface S3 covered by the heating element 105. This further guaranties that the flow of hot air cannot directly flow toward the heating element.

Figure 5:
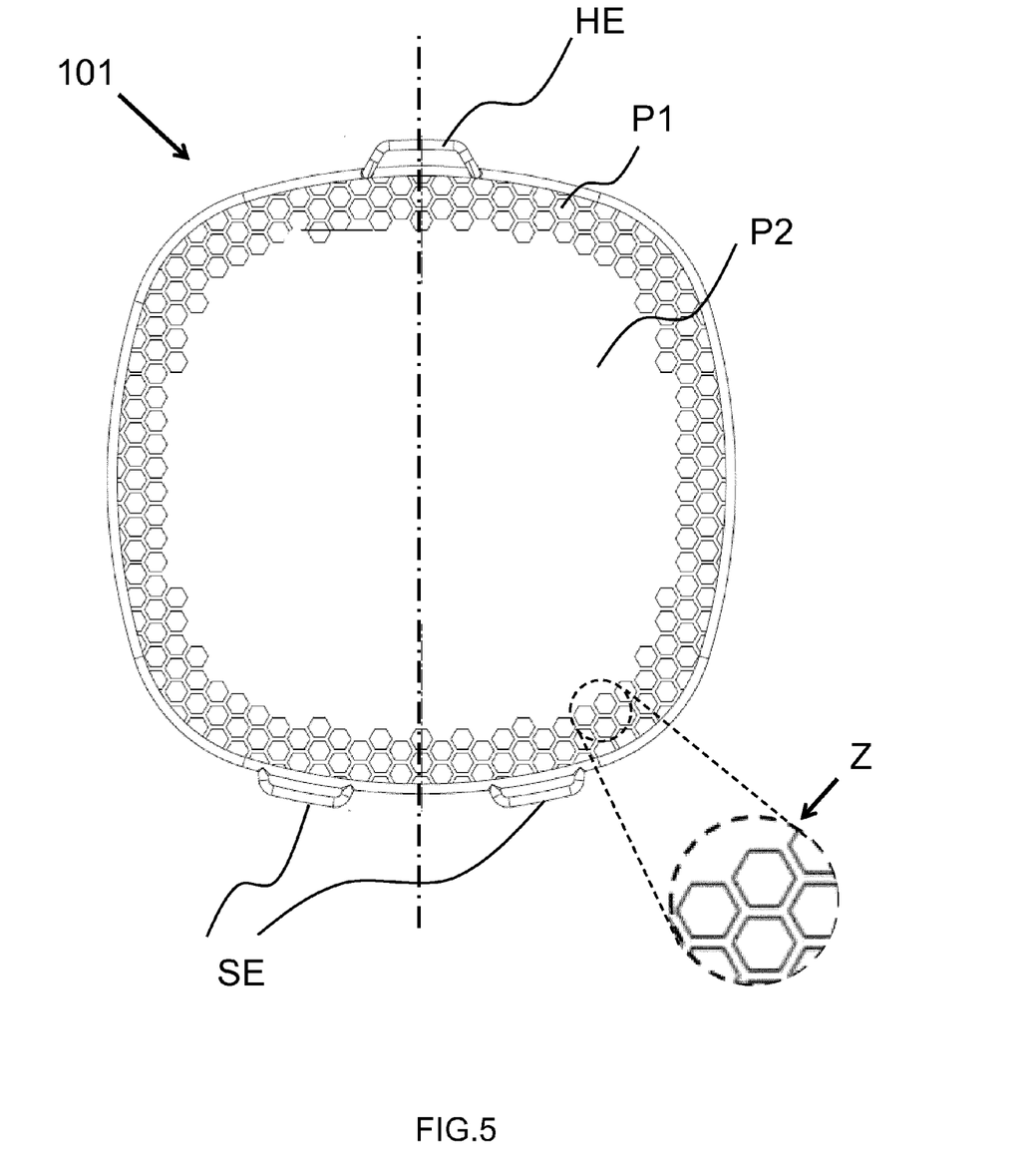
FIG. 5 illustrates a top view of a lid according to the invention.

FIG. 5 illustrates a top view of a lid 101 according to the invention. Advantageously, as illustrated, the first part P1 is made of a meshed structure. The meshed structure comprises a plurality of holes having shapes taken among the set of shapes defined by circular, elliptic, hexagonal (as illustrated on FIG. 5), rhomboidal, and square. Other variations of those shapes could also be considered. Circular, elliptic and hexagonal shapes are preferred because this results in an easier cleaning of the 101 lid by users. As an example, a zoomed view Z of a meshed structure with hexagonal shapes is illustrated. It is noted that the surface S1 as defined previously corresponds to the cumulated surface of each holes among the plurality of holes, excluding the plain parts in between adjacent holes.

Figure 6:
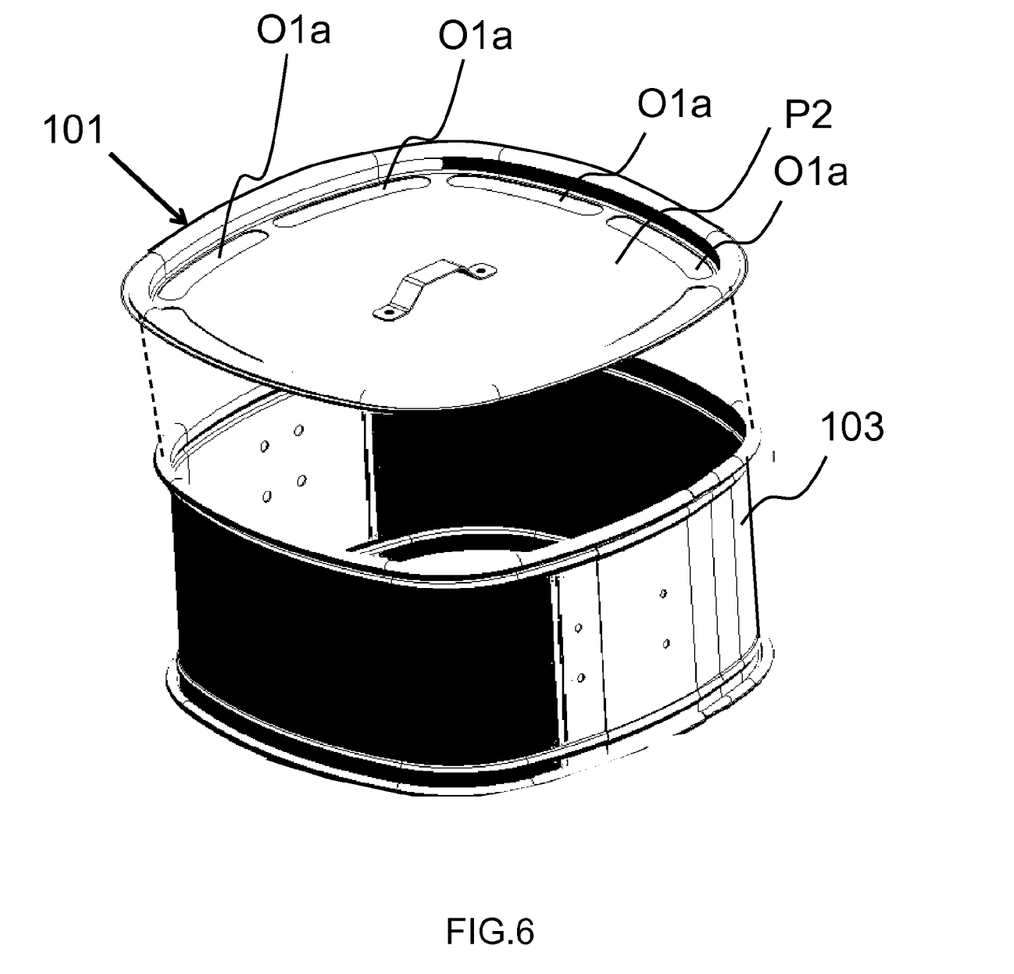
FIG. 6 depicts a food basket cooperating with a lid according to the invention.

FIG. 6 illustrates a lid 101 according to the invention cooperating with a food basket 103, wherein the first part P1 alternatively comprises a plurality of openings O1$a$ distributed over an outer part of the lid 101, and extending essentially horizontally. In this implementation, the lid 101 is essentially flat-shaped with a peripheral part making the lid 101 adapted to lean on an upper edge of the food basket 103. The air-permeable part P1 is made of openings being of larger area than the holes of a meshed structure as described along with FIG. 5, which has some advantages in terms of easier cleaning of the lid 101 by users. It is noted that the surface S1 as defined previously corresponds to the cumulated surface of each openings among the plurality of openings, excluding the plain parts in between adjacent openings.

Figure 7A:
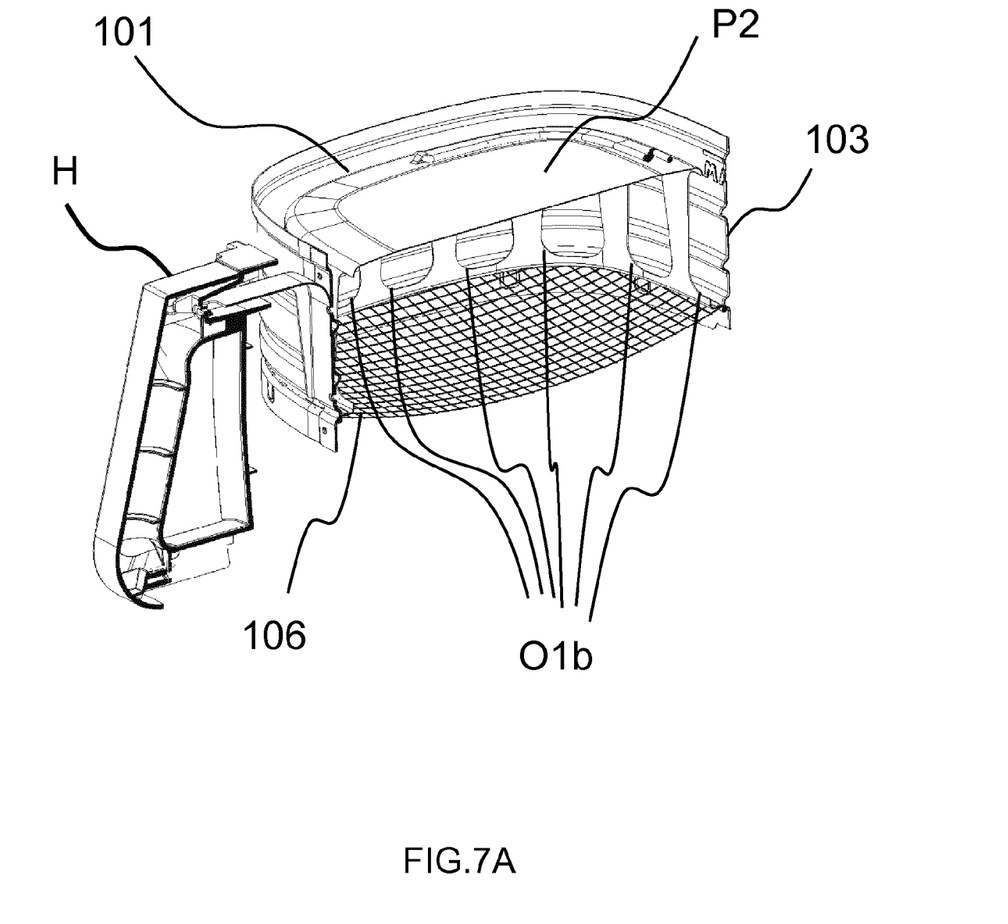
FIG. 7A and FIG. 7B depict a food basket cooperating with a lid according to the invention.
Figure 7B:
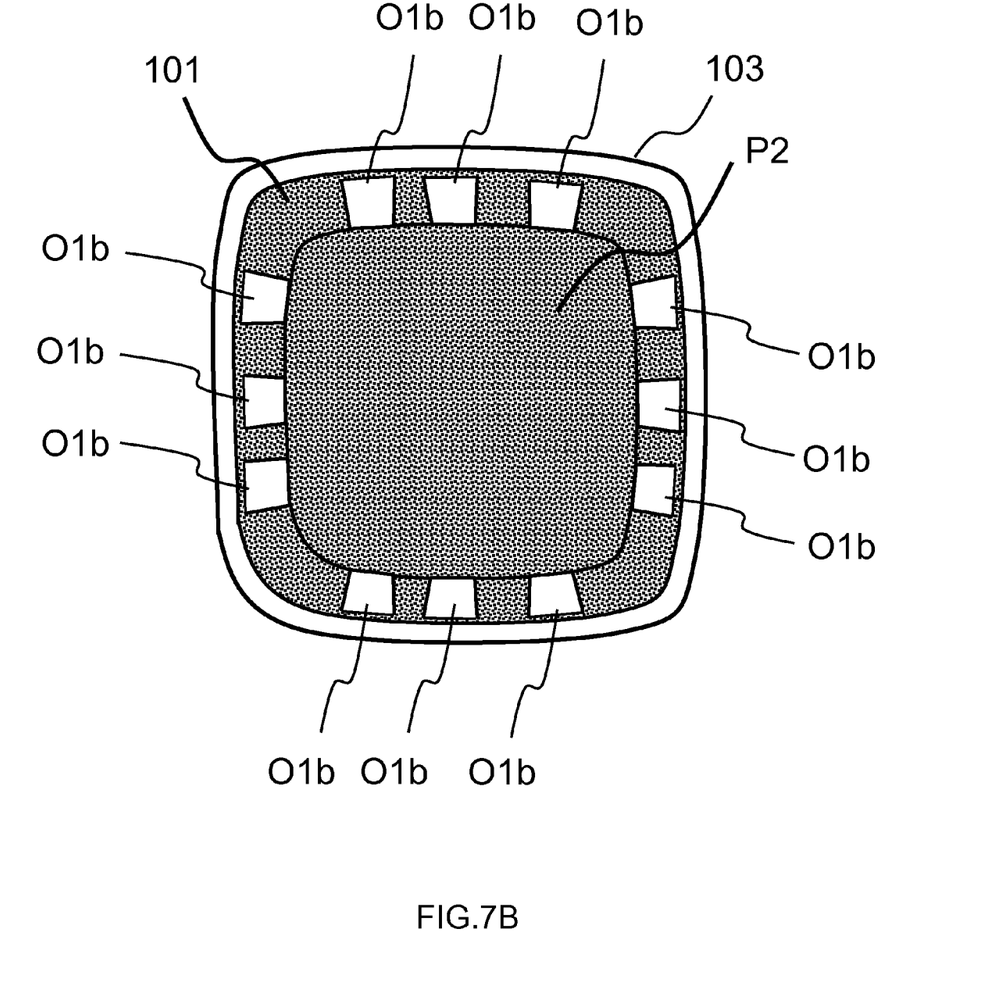

FIG. 7A illustrates a cross-section of a lid 101 according to the invention cooperating with a food basket 103, wherein the first part P1 alternatively comprises a plurality of openings O1$b$ distributed over an outer part of the lid 101, and extending essentially vertically. FIG. 7B illustrates a corresponding top view the lid 101 according to the invention. The air-impermeable second part P2 is represented by confetti-style pattern. In this implementation, the lid 101 is for example truncated-dome-shaped, truncated-conical-shaped, or truncated-pyramidal-shaped, which defines a base making the lid 101 adapted to lean on a bottom part 106 of the food basket 103. The air-permeable part P1 is made of openings being of larger area than the holes of a meshed structure as described along with FIG. 5, which has some advantages in terms of easier cleaning of the lid 101 by users.

Figure 8A:
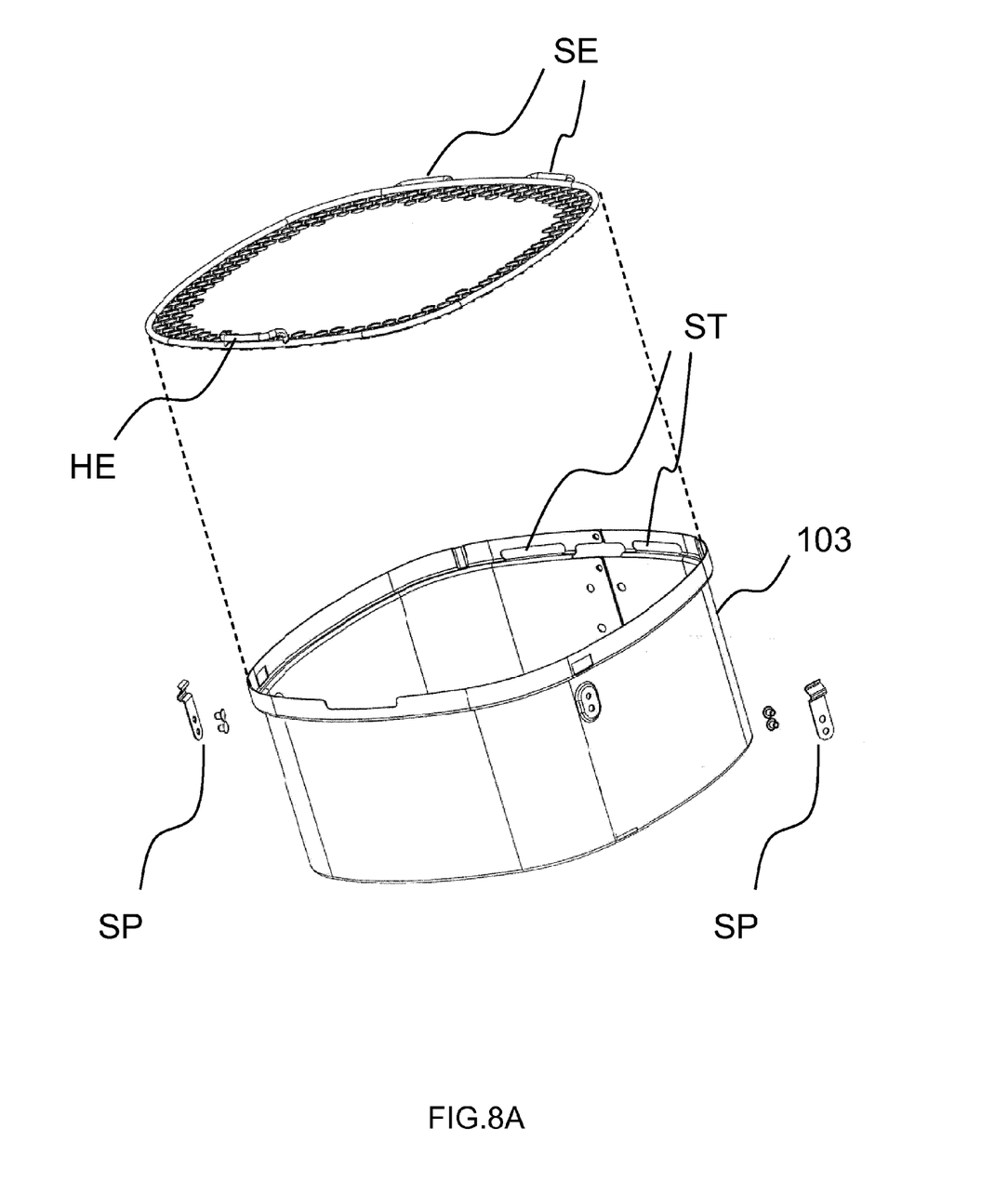
FIG. 8A and FIG. 8B depict a food basket cooperating with a lid according to the invention.

FIG. 8A illustrates an exploded view of a lid 101 according to the invention cooperating with a food basket 103. Advantageously, as illustrated, the lid 101 further comprises at least one supporting element SE extending outward and adapted to cooperate with at least one slit ST made in the upper edge of the food basket 103. In this example, two supporting elements SE cooperate with two slits ST (also illustrated on the top view of FIG. 5). The at least one supporting element SE cooperates with the at least one slit ST to attach the lid 101 on the food basket 103, and also to act as a hinge system so the user can smoothly lift the lid, as illustrated on FIG. 8B.

Figure 8B:
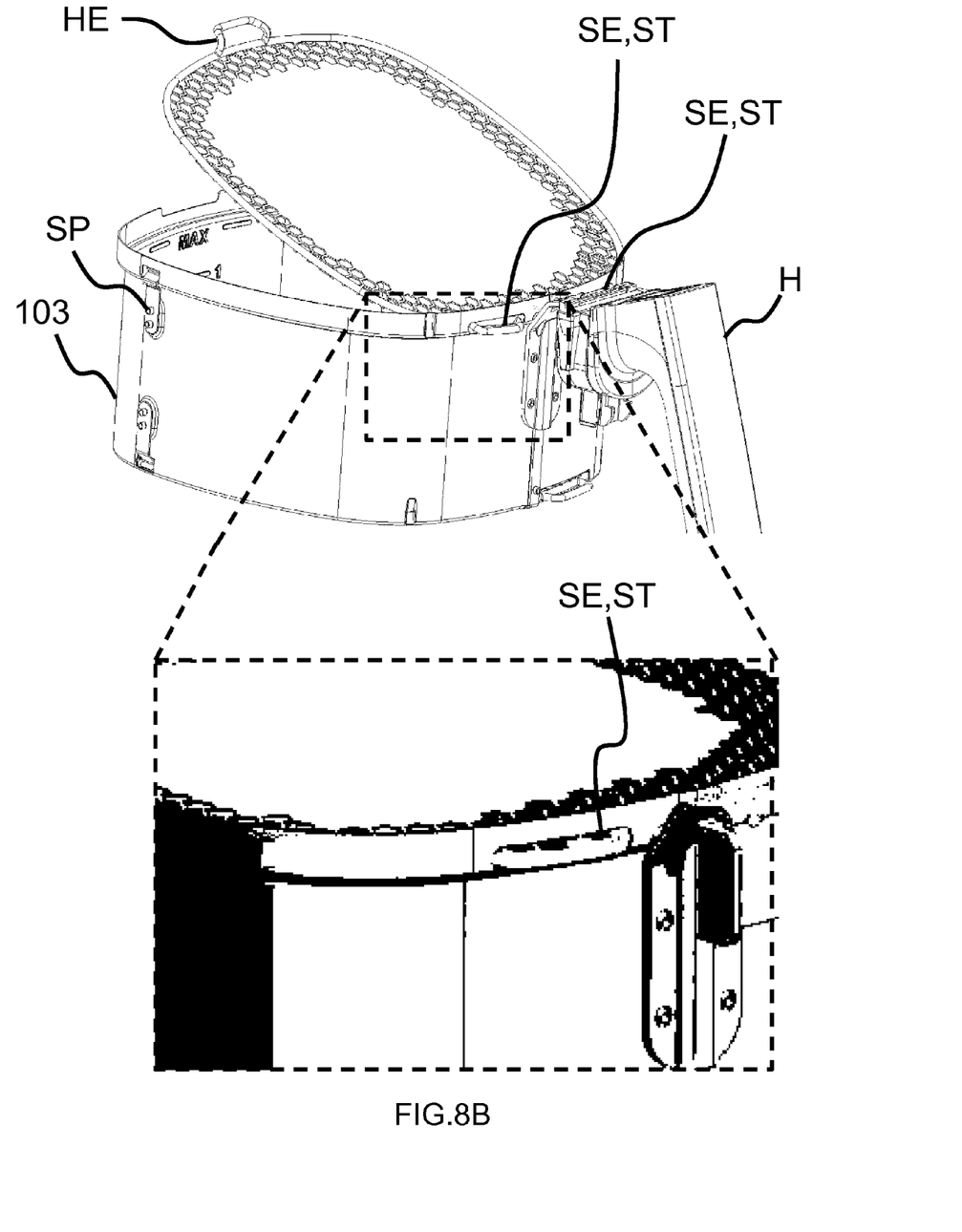

Preferably, the lid 101 further comprises a handle element HE extending opposite the at least one supporting element SE, as illustrated on FIG. 5, FIG. 8A and FIG. 8B. The handle element HE is advantageous to lift the lid 101 away from the food basket 103, for example to access food ingredients placed inside the food basket.

Preferably, the second part P2 is made of a material having an emissivity value larger than 0.5. Having a relatively high emissivity for the air-impermeable part allows heat radiation generated by the heating element 105 penetrating inside the food basket 103 through the air-impermeable part P2 for a better heating of the food ingredients.

Preferably, the second part P2 is made of a material taken among the set defined by brushed stainless steel and coated stainless steel. The brushed stainless steel is advantageous because it has a relative large emissivity value. The coated stainless steel is advantageous because it facilitates cleaning of the lid by users.

The invention also relates to an apparatus 100 as described previously, comprising a lid 101 as described previously.

Preferably, the food basket 103 is equipped with at least one spring element SP for clamping an outer periphery of the lid 101. The outer periphery of the lid 101 may correspond to the outer frame delimiting the lid surface. The at least one spring element SP is illustrated on FIG. 8A and FIG. 8B. The at least one spring element SP is used to lock the lid 101 in place with the food basket 103, so that the lid keeps in place even when an upward flow of hot air is circulating in the food preparation chamber. The at least one spring element SP is for example attached to the external side of the food basket, as illustrated, for example by using screws or rivets, and preferably placed away from the at least one slit ST.

The invention also relates to a method to reduce emission of fumes in an apparatus 100 comprising a food preparation chamber 102, a food basket 103 placed in said food preparation chamber 102, a system 104 for circulating an upward flow of hot air inside said food basket 103, a heating element 105 placed above said food basket 103 to generate said hot air.

Figure 9:
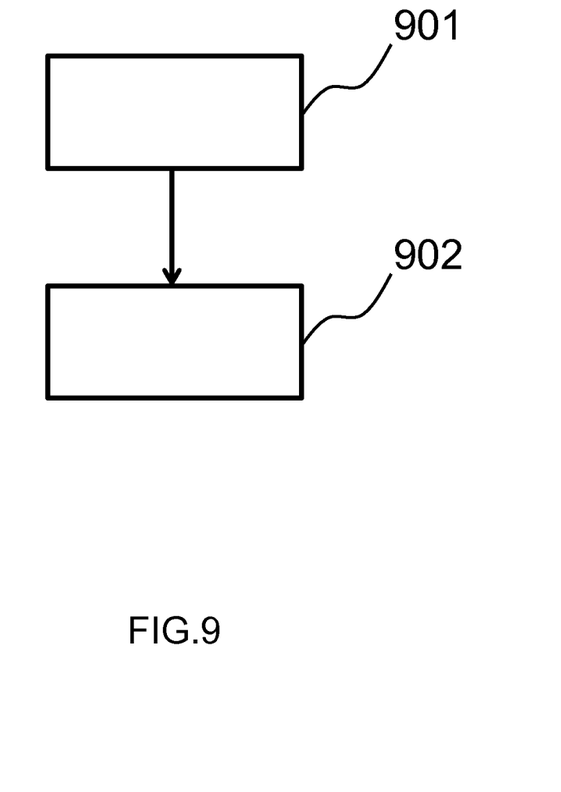
FIG. 9 depicts the flow chart of a method according to the invention to reduce emission of fumes in an air-based fryer.

The method according to the invention comprises the steps of:
- covering 901 the food basket 103 by a first part P1 being air-permeable, and
- covering 902 the food basket 103 by a second part P2 being air-impermeable and facing said heating element 105.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. An air-based fryer apparatus for preparing food, said apparatus comprising:
   a food preparation chamber;
   a food basket placed in said food preparation chamber;
   a system for circulating an upward flow of hot air inside said food basket;
   a heating element placed above said food basket to generate said hot air; and
   a lid placed below the heating element for covering the food basket, wherein said lid comprises:
   a) a first part (P1) being air-permeable, and
   b) a second part (P2) facing said heating element being air-impermeable, wherein the lid further comprises at least one supporting element (SE) extending outward and adapted to cooperate with at least one slit (ST) made in an edge of said food basket, and wherein said food basket is equipped with at least one spring element (SP) for clamping an outer periphery of said lid.

2. The air-based fryer apparatus as claimed in claim 1, wherein:
   the vertical projection of the surface of said first part (P1) defines a first surface (S1),
   the vertical projection of the surface of said second part (P2) defines a second surface (S2), and a ratio between (i) said first surface (S1) and (ii) a sum of said first surface (S1) and said second surface (S2) is in a range between 5% and 50%, inclusive.

3. The air-based fryer apparatus as claimed in claim 1, wherein a vertical projection of the surface of said second part (P2) defines a second surface (S2), and wherein said second surface (S2) is substantially the same as an overall surface (S3) covered by said heating element.

4. The air-based fryer apparatus as claimed in claim 1, wherein said first part (P1) is made of a meshed structure.

5. The air-based fryer apparatus as claimed in claim 4, wherein said meshed structure comprises a plurality of holes having shapes selected from among a set of shapes defined by circular, elliptic, hexagonal, rhomboidal, and square.

6. The air-based fryer apparatus as claimed in claim 1, wherein said first part (P1) comprises a plurality of openings (O1a, O1b).

7. The air-based fryer apparatus as claimed in claim 1, wherein the lid further comprises a peripheral part thereof adapted for physical placement on an upper edge of said food basket.

8. The air-based fryer apparatus as claimed in claim 1, wherein the lid further comprises a peripheral part thereof adapted for physical placement on a bottom part of said food basket.

9. The air-based fryer apparatus as claimed in claim 1, wherein said second part (P2) is made of a material having an emissivity value larger than 0.5.

10. The air-based fryer apparatus as claimed in claim 1, wherein said second part (P2) comprises a material selected from among a set defined by brushed stainless steel and coated stainless steel.

11. An air-based fryer apparatus for preparing food, said apparatus comprising:
    a food preparation chamber;
    a food basket placed in said food preparation chamber;
    a system for circulating an upward flow of hot air inside said food basket;
    a heating element placed above said food basket to generate said hot air; and
    a lid placed below the heating element for covering the food basket, wherein said lid comprises:
    a) a first part (P1) being air-permeable, and
    b) a second part (P2) facing said heating element being air-impermeable, wherein the lid further comprises at least one supporting element (SE) extending outward and adapted to cooperate with at least one slit (ST) made in an upper edge of said food basket.

12. The air-based fryer apparatus as claimed in claim 11, wherein the lid further comprises a handle element (HE) extending opposite said at least one supporting element (SE).

13. An air-based fryer apparatus for preparing food, said apparatus comprising:
    a food preparation chamber;
    a food basket placed in said food preparation chamber;
    a system for circulating an upward flow of hot air inside said food basket;
    a heating element placed above said food basket to generate said hot air; and
    a lid placed below the heating element for covering the food basket, wherein said lid comprises:
    a) a first part (P1) being air-permeable, and
    b) a second part (P2) facing said heating element being air-impermeable, wherein said food basket is equipped with at least one spring element (SP) for clamping an outer periphery of said lid.

* * * * *